United States Patent
Alton

(10) Patent No.: US 10,081,382 B1
(45) Date of Patent: Sep. 25, 2018

(54) ELECTRONIC DEVICE MOUNTING SYSTEM

(71) Applicant: Jeffrey Alton, Auburn, WA (US)

(72) Inventor: Jeffrey Alton, Auburn, WA (US)

( * ) Notice: Subject to any disclaimer, the term of this patent is extended or adjusted under 35 U.S.C. 154(b) by 0 days.

(21) Appl. No.: 15/468,243

(22) Filed: Mar. 24, 2017

(51) Int. Cl.
*F16M 11/00* (2006.01)
*B62B 9/26* (2006.01)
*F16M 13/02* (2006.01)
*H05K 5/02* (2006.01)

(52) U.S. Cl.
CPC ............ *B62B 9/26* (2013.01); *F16M 13/022* (2013.01); *H05K 5/0204* (2013.01); *B62B 2202/56* (2013.01)

(58) Field of Classification Search
CPC .... F16M 13/022; F16M 11/041; F16M 13/00; F16M 11/10; F16M 11/14
USPC .......... 248/230.1, 230.4, 230.7, 316.1, 316.4
See application file for complete search history.

(56) References Cited

U.S. PATENT DOCUMENTS

| | | | |
|---|---|---|---|
| D364,952 S | 12/1995 | Cheng | |
| 5,699,988 A * | 12/1997 | Boettger | A61G 5/10 248/122.1 |
| 6,217,180 B1 * | 4/2001 | Eisenbraum | B62B 9/005 359/871 |
| 7,861,985 B2 | 1/2011 | Galvin | |
| 7,861,991 B1 | 1/2011 | Sylvritooth-Jackson | |
| 8,020,829 B1 | 9/2011 | Tamayori | |
| 8,978,947 B1 | 3/2015 | Schneidau | |
| 9,103,492 B2 * | 8/2015 | Springer | F16M 11/041 |
| 9,145,158 B2 | 9/2015 | Cruz | |
| 9,285,832 B2 * | 3/2016 | Galant | F16M 11/105 |
| 9,568,148 B2 * | 2/2017 | Carnevali | B60R 11/0241 |
| 2009/0173863 A1 * | 7/2009 | Crown | B60R 11/0241 248/316.4 |
| 2012/0193496 A1 * | 8/2012 | Li | F16M 11/041 248/316.1 |
| 2013/0026324 A1 * | 1/2013 | Fischer | F16M 11/041 248/316.1 |
| 2015/0358044 A1 * | 12/2015 | Barstead | H04B 1/3888 455/575.1 |

FOREIGN PATENT DOCUMENTS

WO    WO2012094069    7/2012

\* cited by examiner

*Primary Examiner* — Steven M Marsh

(57) ABSTRACT

An electronic device mounting system for mounting an electronic device to a cart includes a cart that may have a child seated therein. An electronic device is provided and a mounting unit is removably coupled to the cart. The electronic device is removably positioned in the mounting unit and the mounting unit is positioned at a selected orientation with respect to the cart. In this way the mounting unit facilitates the electronic device to be accessible to the child thereby occupying the child.

9 Claims, 5 Drawing Sheets

ELECTRONIC DEVICE MOUNTING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to mounting devices and more particularly pertains to a new mounting device for mounting an electronic device to a cart.

BRIEF SUMMARY OF THE INVENTION

An embodiment of the disclosure meets the needs presented above by generally comprising a cart that may have a child seated therein. An electronic device is provided and a mounting unit is removably coupled to the cart. The electronic device is removably positioned in the mounting unit and the mounting unit is positioned at a selected orientation with respect to the cart. In this way the mounting unit facilitates the electronic device to be accessible to the child thereby occupying the child.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
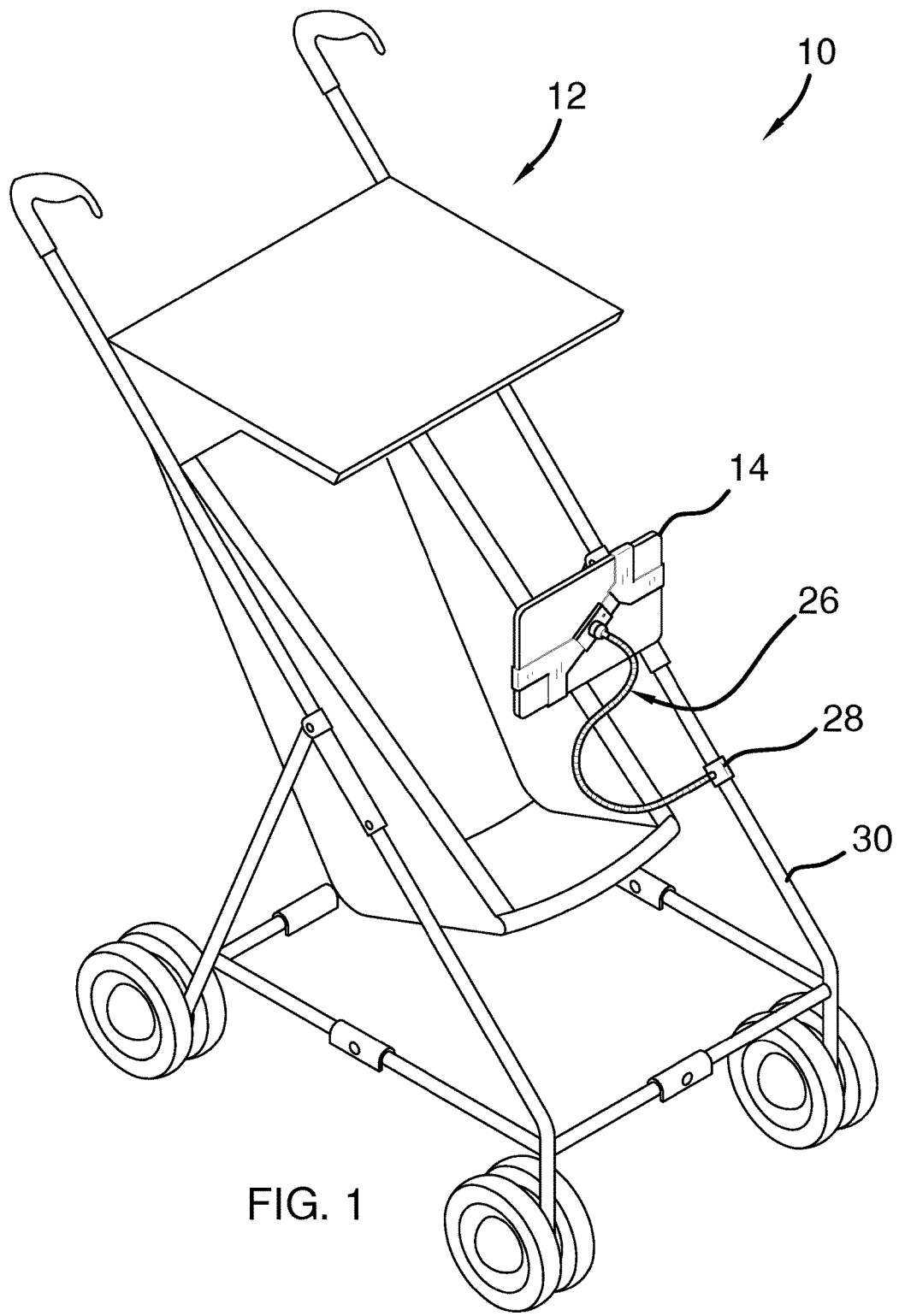
FIG. 1 is a perspective in-use view of an electronic device mounting system according to an embodiment of the disclosure.
Figure 2:
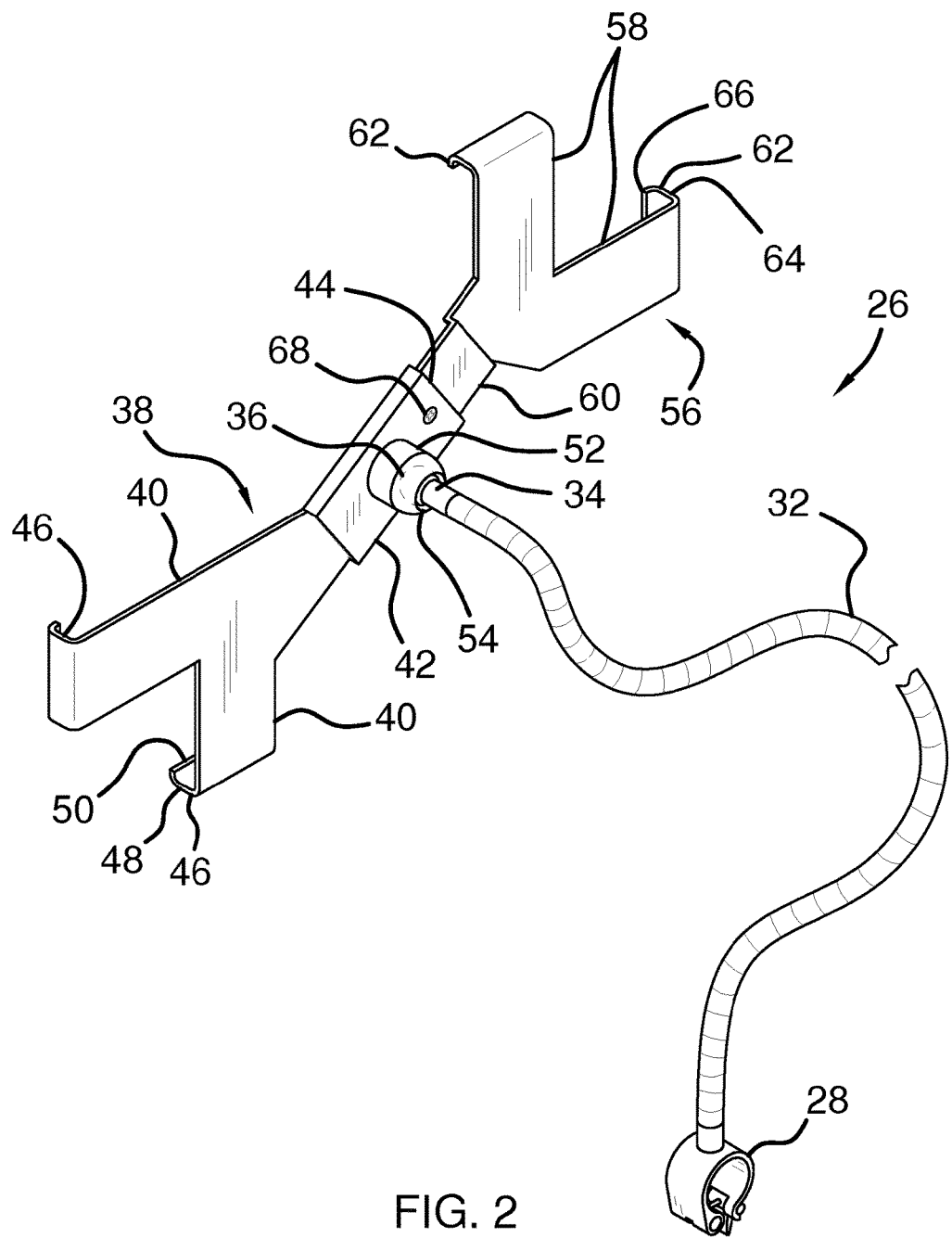
FIG. 2 is a back perspective view of a mounting unit of an embodiment of the disclosure.
Figure 3:
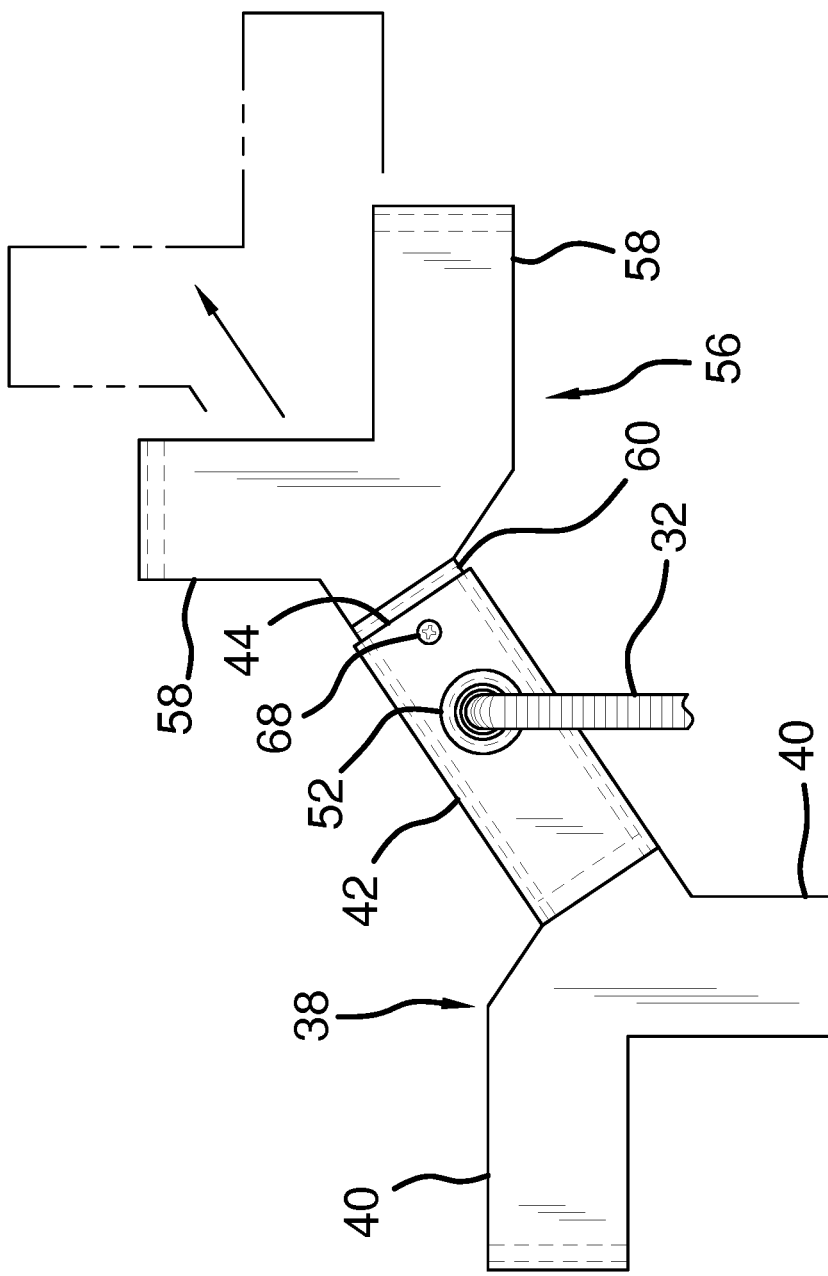
FIG. 3 is a back view of a mounting unit of an embodiment of the disclosure.
Figure 4:
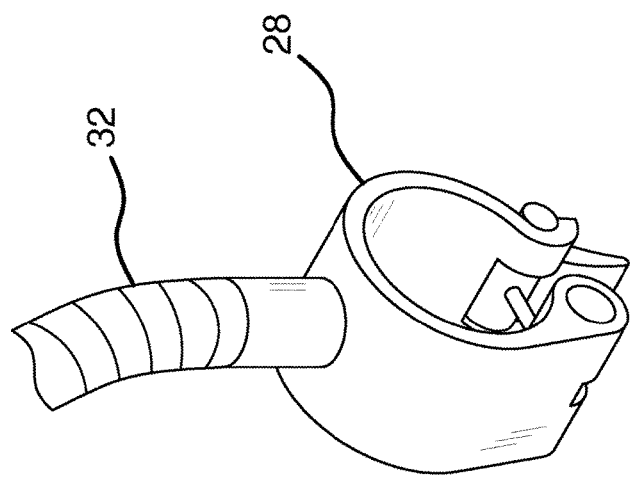
FIG. 4 is a perspective view of a coupler of an embodiment of the disclosure.
Figure 5:
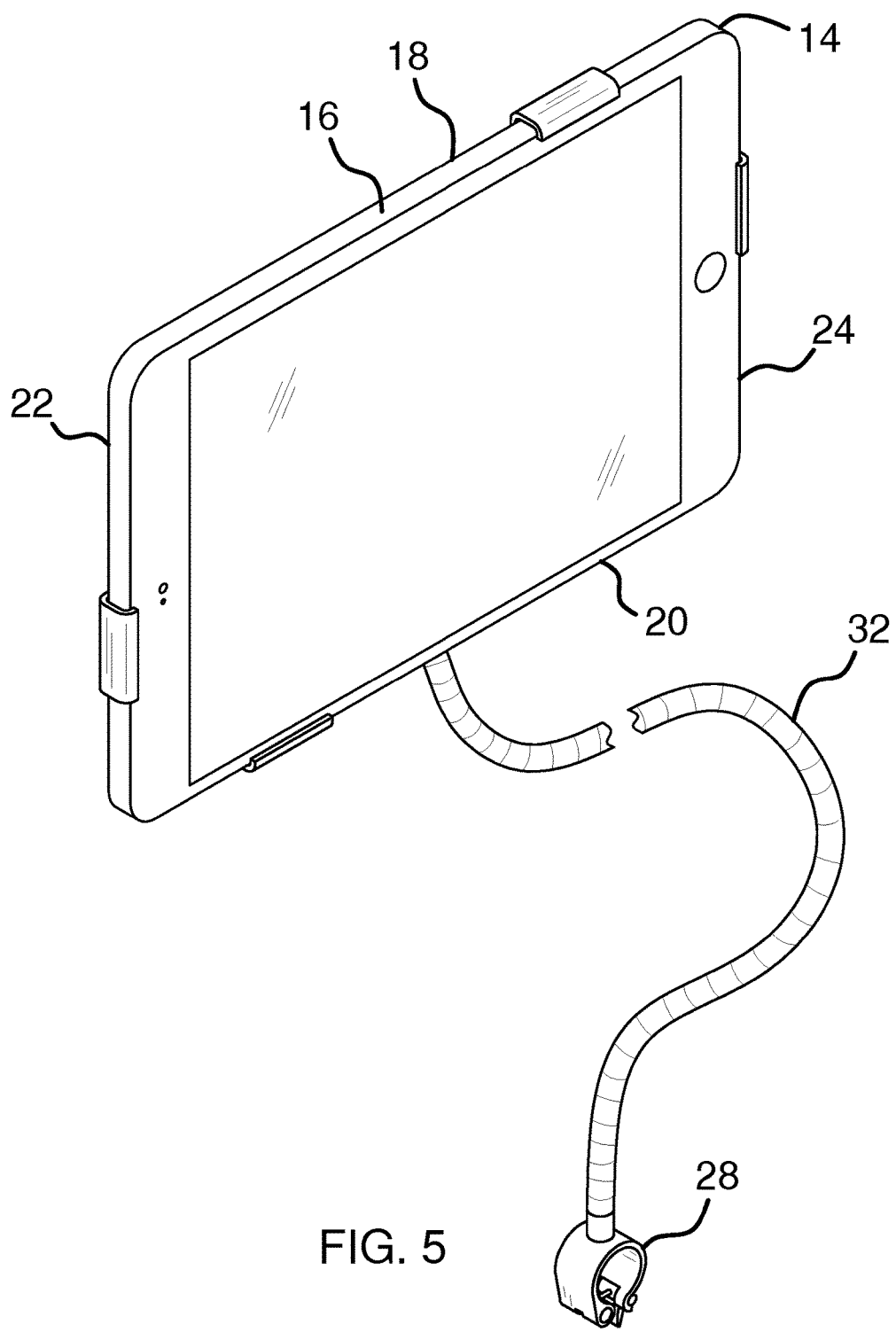
FIG. 5 is a front perspective view of an embodiment of the disclosure.

With reference now to the drawings, and in particular to FIGS. 1 through 5 thereof, a new mounting device embodying the principles and concepts of an embodiment of the disclosure and generally designated by the reference numeral 10 will be described.

As best illustrated in FIGS. 1 through 5, the electronic device mounting system 10 generally comprises a cart 12 that may have a child seated therein. The cart 12 may be a stroller or any other wheeled cart 12. An electronic device 14 is provided that has a perimeter edge 16. The perimeter edge 16 has a top side 18, a bottom side 20, a first lateral side 22 and a second lateral side 24. The electronic device 14 may be a smart phone, a tablet or any other electronic device 14 capable of displaying video and emitting audio.

A mounting unit 26 is provided and the mounting unit 26 is removably coupled to the cart 12. The electronic device 14 is removably positioned in the mounting unit 26 and the mounting unit 26 is positioned at a selected orientation with respect to the cart 12. In this way the mounting unit 26 facilitates the electronic device 14 to be accessible to the child thereby occupying the child.

The mounting unit 26 comprises a coupler 28 that may be manipulated and the coupler 28 releasably engages the cart 12. The coupler 28 may be a shaft lock ring, a locking clamp or any other mechanical type of openable and closable coupler that releasably engages a cylindrical shaft. The coupler 28 may engage a support 30 on the cart 12 or the like.

A gooseneck 32 is provided and the gooseneck 32 is coupled to the coupler 28. The gooseneck 32 has a distal end 34 with respect to the coupler 28. The gooseneck 32 is comprised of a resiliently bendable material such that gooseneck 32 is positionable in a selected shape. A ball 36 is coupled to the distal end 34 of the gooseneck 32 and the gooseneck 32 may have a length ranging between approximately 15.0 cm and 30.0 cm.

A first gripping member 38 is provided that has a pair of first arms 40 and a central arm 42. Each of the first arms 40 angles away from the central arm 42 such that the first gripping member 38 has a Y-shape. The central arm 42 has a distal end 44 with respect to the first arms 40. The distal end 44 of the central arm 42 is open and the central arm 42 is substantially hollow.

Each of the first arms 40 has a grip 46 extending away therefrom and the grip 46 corresponding to each of the first arms 40 is spaced from the central arm 42. The grip 46 corresponding to each of the first arms 40 engage an associated one of the first lateral side 22 and the bottom side 20 of the electronic device 14. The grip 46 includes a leg 48 and a foot 50, and the foot 50 is spaced from the corresponding first arm 40.

A cup 52 is provided and the cup 52 is coupled to the central arm 42. The cup 52 has a distal end 54 with respect to the central arm 42 and the distal end 54 of the cup 52 is open. The ball 36 is rotatably positioned in the cup 52 such that the gooseneck 32 is movably coupled to the first gripping member 38. Moreover, the distal end 54 of the cup 52 has a diameter that is less than a diameter of the ball 36 such that the ball 36 is inhibited from being removed from the cup 52.

A second gripping member 56 is provided that has a pair of second arms 58 and a middle arm 60. Each of the second arms 58 angles away from the middle arm 60 such that the second gripping member 56 has a Y-shape. The distal end 44 of the central arm 42 insertably receives the middle arm 60 such that the second gripping member 56 is slidably coupled to the first gripping member 38. Each of the second arms 58 has a grip 62 extending away therefrom and the grip 62 corresponding to each of the second arms 58 is spaced from the middle arm 60. The grip 62 corresponding to each of the second arms 58 engages an associated one of the first lateral side 22 and the top side 18 of the electronic device 14. The grip 62 corresponding to the second arms 58 includes a leg 64 and a foot 66, and the foot 66 is spaced from the corresponding second arm 58.

A fastener 68 is provided and the fastener 68 extends through the central arm 42 to engage the middle arm 60. In this way the second gripping member 56 is retained in a selected position with respect to the first gripping member 38. The fastener 68 may be a screw or the like.

In use, the coupler 28 is manipulated to engage the cart 12. The electronic device 14 is positioned such that the grips corresponding to each of the first arms 40 engages the electronic device 14. The second gripping member 56 is slid in the central arm 42 unit the grip 62 corresponding to each of the second arms 58 engages the electronic device 14. The fastener 68 is manipulated to inhibit the second gripping member 56 from sliding in the central arm 42. The gooseneck 32 is manipulated to position the electronic device 14 at a selected orientation with respect to the cart 12. In this way the child in the cart 12 watches video displayed on the electronic device 14 thereby entertaining the child when the cart 12 is rolled. Thus, a parent may jog, shop, or pursue any activity while pushing the cart 12 without having to attend to the child.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic device mounting system comprising:
   a cart being configured to have a child seated therein;
   an electronic device; and
   a mounting unit being removably coupled to said cart, said electronic device being removably positioned in said mounting unit, said mounting unit being positioned at a selected orientation with respect to said cart wherein said mounting unit is configured to facilitate said electronic device to be accessible to the child thereby occupying the child, said mounting unit comprising
   a first gripping member having a pair of first arms and a central arm, each of said first arms being fixedly positioned relative to and angling away from said central arm such that said first gripping member has a Y-shape, said central arm having a distal end with respect to said first arms, said distal end of said central arm is open, said central arm being substantially hollow,
   a second gripping member having a pair of second arms and a middle arm, each of said second arms angling away from said middle arm such that said second gripping member has a Y-shape, said middle arm being linearly aligned with said central arm, said distal end of said central arm insertably receiving said middle arm such that said second gripping member is slidably coupled to said first gripping member to adjust spacing between said pair of first arms and said pair of second arms, and
   a fastener extending through said central arm, said fastener engaging said middle arm wherein said fastener secures said middle arm in a static position relative to said central arm.

2. The system according to claim 1, wherein said mounting unit comprises a coupler being configured to be manipulated, said coupler releasably engaging said cart.

3. The system according to claim 2, further comprising a gooseneck being coupled to said coupler, said gooseneck having a distal end with respect to said coupler, said gooseneck being comprised of a resiliently bendable material such that gooseneck is positionable in a selected shape.

4. The system according to claim 3, further comprising a ball being coupled to said distal end of said gooseneck.

5. The system according to claim 1, wherein:
   said electronic device has a first lateral side and a second lateral side; and
   each of said first arms has a grip extending away therefrom, said grip corresponding to each of said first arms being spaced from said central arm, said grip corresponding to each of said first arms engaging an associated one of said first lateral side and said bottom side of said electronic device.

6. The system according to claim 1, further comprising a cup being coupled to said central arm, said cup having a distal end with respect to said central arm, said distal end of said cup being open.

7. The system according to claim 6, wherein:
   said mounting unit includes a gooseneck;

a ball being coupled to said gooseneck; and said ball being rotatably positioned in said cup such that said gooseneck is movably coupled to said first gripping member, said distal end of said cup having a diameter being less than a diameter of said ball such that said ball is inhibited from being removed from said cup.

8. The system according to claim 1, wherein:

said electronic device has a first lateral side and a top side; and each of said second arms has a grip extending away therefrom, said grip corresponding to each of said second arms being spaced from said middle arm, said grip corresponding to each of said second arms engaging an associated one of said first lateral side and said top side of said electronic device.

9. An electronic device mounting system comprising:

a cart being configured to have a child seated therein;

an electronic device having a perimeter edge, said perimeter edge having a top side, a bottom side, a first lateral side and a second lateral side; and a mounting unit being removably coupled to said cart, said electronic device being removably positioned in said mounting unit, said mounting unit being positioned at a selected orientation with respect to said cart wherein said mounting unit is configured to facilitate said electronic device to be accessible to the child thereby occupying the child, said mounting unit comprising:

a coupler being configured to be manipulated, said coupler releasably engaging said cart, a gooseneck being coupled to said coupler, said gooseneck having a distal end with respect to said coupler, said gooseneck being comprised of a resiliently bendable material such that gooseneck is positionable in a selected shape, a ball being coupled to said distal end of said gooseneck, a first gripping member having a pair of first arms and a central arm, each of said first arms being fixedly positioned relative to and angling away from said central arm such that said first gripping member has a Y-shape, said central arm having a distal end with respect to said first arms, said distal end of said central arm being open, said central arm being substantially hollow, each of said first arms having a grip extending away therefrom, said grip corresponding to each of said first arms being spaced from said central arm, said grip corresponding to each of said first arms engaging an associated one of said first lateral side and said bottom side of said electronic device, a cup being coupled to said central arm, said cup having a distal end with respect to said central arm, said distal end of said cup being open, said ball being rotatably positioned in said cup such that said gooseneck is movably coupled to said first gripping member, said distal end of said cup having a diameter being less than a diameter of said ball such that said ball is inhibited from being removed from said cup, a second gripping member having a pair of second arms and a middle arm, each of said second arms angling away from said middle arm such that said second gripping member has a Y-shape, said middle arm being linearly aligned with said central arm, said distal end of said central arm insertably receiving said middle arm such that said second gripping member is slidably coupled to said first gripping member to adjust spacing between said pair of first arms and said pair of second arms, each of said second arms having a grip extending away therefrom, said grip corresponding to each of said second arms being spaced from said middle arm, said grip corresponding to each of said second arms engaging an associated one of said first lateral side and said top side of said electronic device, and a fastener extending through said central arm, said fastener engaging said middle arm wherein said fastener secures said middle arm in a static position relative to said central arm.

\* \* \* \* \*